United States Patent
Hainle et al.

[11] Patent Number: 5,899,378
[45] Date of Patent: May 4, 1999

[54] PLASTIC HOUSING

[75] Inventors: Rudi Hainle, Ludwigsburg; Arthur Klotz, Remseck; Rudolf Leipelt, Marbach, all of Germany

[73] Assignee: Filterwerk Mann & Hummel GmbH, Ludwigsburg, Germany

[21] Appl. No.: 08/913,251

[22] PCT Filed: Mar. 7, 1996

[86] PCT No.: PCT/EP96/00976

§ 371 Date: Sep. 10, 1997

§ 102(e) Date: Sep. 10, 1997

[87] PCT Pub. No.: WO96/28653

PCT Pub. Date: Sep. 19, 1996

[30] Foreign Application Priority Data

Mar. 11, 1995 [DE] Germany .......................... 195 08 921

[51] Int. Cl.⁶ ..................................................... F01P 7/14
[52] U.S. Cl. ........................ 236/34.5; 156/73.5; 251/366
[58] Field of Search ..................... 251/366–368; 236/34, 34.5; 156/73.5; 264/68; 228/114.5; 29/890.129, 890.131

[56] References Cited

U.S. PATENT DOCUMENTS

| | | | |
|---|---|---|---|
| 4,142,677 | 3/1979 | Ludwig | 251/367 |
| 4,175,590 | 11/1979 | Grandclement | 251/366 |
| 4,175,696 | 11/1979 | Braukmann | 251/367 |
| 4,628,959 | 12/1986 | Parker et al. | 251/368 |
| 4,663,206 | 5/1987 | Bouycoucos et al. | 156/73.5 |
| 4,919,987 | 4/1990 | Manner | 428/60 |
| 5,286,001 | 2/1994 | Rafeld | 251/366 |
| 5,551,482 | 9/1996 | Dixon et al. | 251/366 |

FOREIGN PATENT DOCUMENTS

| | | |
|---|---|---|
| 223695 | 5/1987 | European Pat. Off. . |
| 2235037 | 2/1991 | United Kingdom . |

*Primary Examiner*—William E. Tapolcai
*Attorney, Agent, or Firm*—Evenson, McKeown, Edwards & Lenahan, P.L.L.C.

[57] ABSTRACT

A plastic housing is proposed comprising a upper part, a bottom part and a control element to be disposed between the two parts, in particular a wax thermostat (10) for controlling the temperature of the intake air of a mixture-compressing internal combustion engine. The position of the control element is adjusted on assembly. This adjustment is carried out in that the control element is positioned by welding the housing bottom part (13) and the housing upper part (14) of the plastic housing (19) in the correct axial position.

6 Claims, 2 Drawing Sheets

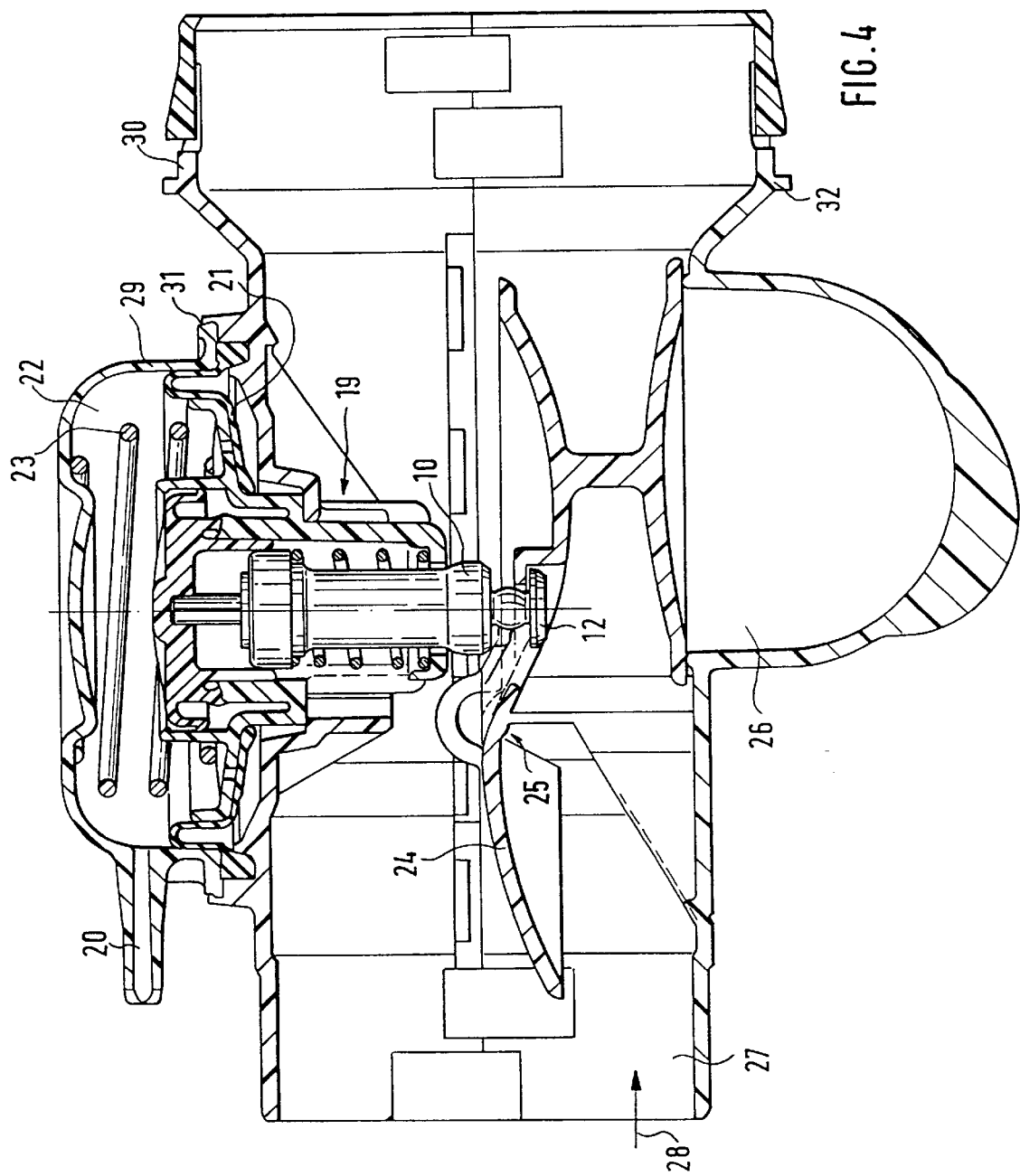

PLASTIC HOUSING

BACKGROUND OF THE INVENTION

The invention relates to a housing of plastic comprising an upper part, a bottom part and an adjusting element arranged between the two parts, wherein the position of the adjusting element is fixed during assembly.

A plastic housing of this kind can be used in particular for correctly positioning a wax thermostat in the correct axial position in an adjusting valve housing for controlling the temperature of the intake air of mixture—compressing internal combustion engines.

A device for controlling the temperature of intake air is disclosed in DE-PS 28 16 727. In this device there is a wax thermostat in a two part housing, the two parts being screwed together. In order to position the wax thermostat, the one housing part is rotated relative to the other until the correct position is reached. Then this position is fixed and sealed with an appropriate substance, such as an adhesive, for example. It is apparent that this adjustment is very expensive, both as regards the material (additional brass screw) and as regards the effort required for assembly, and there is no absolute assurance of the required tightness of sealing or against subsequent undesired rotation or change in position.

SUMMARY OF THE INVENTION

It is therefore the object of the invention to provide a housing made of plastic with which the setting of an adjusting element can be performed in a simple manner, and after which the setting will no longer be able to change as a result of environmental or other influences.

This object is achieved by providing a plastic housing comprising an upper part, a bottom part and an adjusting element arranged between the two parts, in which the position of the adjusting element is fixed during assembly, and the positioning of the adjusting element is carried out by welding the upper part and lower part of the plastic housing in correct axial position. In particular, the adjusting element may comprise a wax thermostat for controlling the temperature of the intake air of a mixture-compressing internal combustion engine.

The core idea of the invention lies in the creation of a plastic housing comprising an upper part and a lower part, which is configured such that it is possible to weld the two parts together. It must be thereby be taken into account that the locations at which welding is carried out are able to accommodate sufficiently large axial position tolerances, that is, the connection points are provided with a tolerance range which permits welding within a certain allowable range of positions.

A further advantage of the invention is that the assembly of the plastic housing and the setting of the adjusting element are performed in a single operation, and result in an air-tight connection between the two parts.

In accordance with one advantageous embodiment of the invention, the welding of the two parts is performed by a spin-welding procedure. Of course, other welding methods are possible.

To facilitate simple preliminary assembly of the components, that is to say, of the adjusting element or wax thermostat with the upper part and lower part of the plastic housing, as well as possible other parts which may be disposed in the housing, the upper part and lower part have snap fasteners. Because of this snap fastening, it is possible to arrange the individual components in the housing and snap the housing together, and in this preassembled state to carry out a temperature adjustment of the wax thermostat. Then the adjustment welding, that is to say the welding, sealing and setting, is carried out in a single operation.

To accommodate the varying amounts of welding efflux at the location of the weld, in accordance with another embodiment of the invention, chambers are provided, one in front and the other behind the location of the weld. The weld efflux collects in these chambers, so that the formation of elements, such as a flashing or the like, which might interfere with functional operation is effectively prevented.

These and other features of preferred embodiments of the invention are to be found not only in the claims but also in the description and the drawings, while any one or more of the individual features can be realized in the form of sub-combinations in the embodiment of the invention and in other fields, and can represent advantageous embodiments susceptible of patenting, for which protection is claimed herewith.

BRIEF DESCRIPTION OF THE DRAWINGS

Embodiments of the invention are illustrated in the drawings, and will be explained in further detail below. The drawings show.

DETAILED DESCRIPTION OF THE PREFERRED EMBODIMENT

Figure 2:
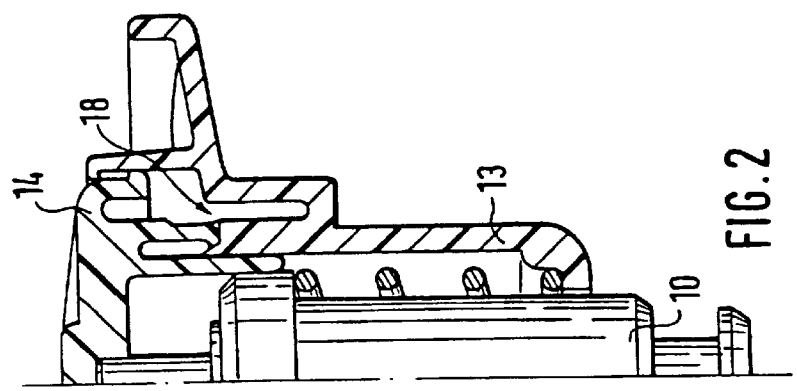
Figure 1:
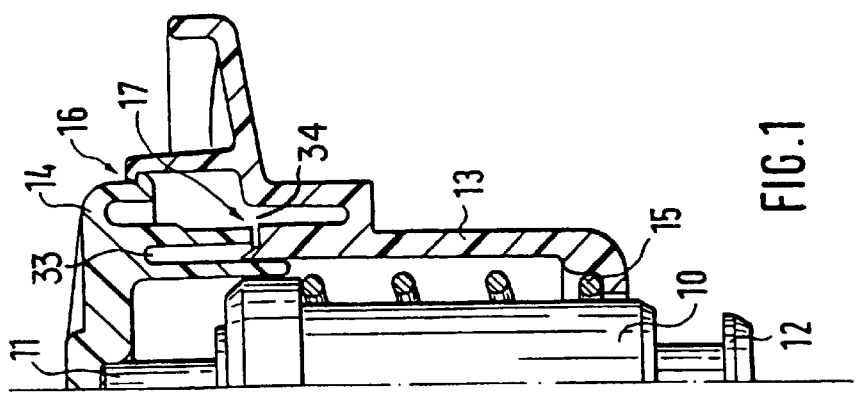

In FIG. 1 a wax thermostat 10 is shown. This is shown with a plunger 11 and a mounting pin 12. The wax thermostat is situated in a plastic housing, comprising a bottom part 13 and a top part 14. A compression spring 15 assures that the plunger 11 of the wax thermostat 10 is urged firmly against the upper part 14 of the housing. The upper part 14 is attached by a snap connection 13 to the bottom part 13 of the housing. This position is the preassembled position, that is, an assembly of the parts is achieved in that the wax thermostat 10 as well as the compression spring 15 are inserted in the lower part 13 of the housing and subsequently the upper part of the housing is attached. Thereafter, the welding of the two housing parts takes place in area 17. This is shown in FIG. 2. The welding is carried out with a spin welding process. During the welding process the housing bottom part lies in a receptacle or holder. The upper part of the housing is caused to rotate by the welding tool and pressed against the bottom part. In the welding zone 18 the two parts bond together. The welding of the two parts is performed to a depth that is necessary to reach the dimension A, that is, the size of the adjustment of the wax thermostat. As seen in FIG. 1, a pair of chambers 33 and 34 are formed between upper part 14 and lower part 13. Chambers 33 and 34 receive weld efflux after the welding process.

Figure 3:
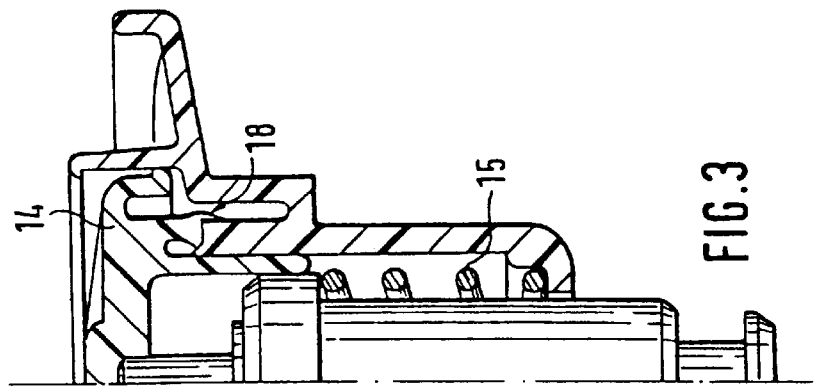
FIG. 1 to FIG. 3 a cross-section representation of the procedure for adjustment/welding of a housing, FIG. 4 a cold-air/warm-air regulating device.

In FIG. 3 the maximum possible depth of penetration between the upper part 14 and the lower part 13 of the housing in the area of the weld zone 18 is shown. Of course, the structural configuration of the upper and lower parts can also permit a longer welding movement.

FIG. 4 shows a complete cold-air/warm-air regulating device, which is equipped with a weld-adjusted plastic housing for the wax thermostat. The wax thermostat 10 is arranged in the plastic housing 19 which is comprised of the housing bottom part and the housing top part. The welding-adjustment has already taken place. A membrane 21 of rubber and a return spring 23 which extends through a pressure control chamber 22 are arranged adjacent the plastic housing 19. This pressure control chamber 22 is formed by a housing 29 which is sealingly welded to the air carrying upper part 30 at the junction surface 31. The air duct upper part 30 is snap-fastened to the air duct lower part 32. The control pressure chamber is connected through a control pressure line to an intake manifold of an internal combustion engine. A control valve 24 is attached movably to the mounting pin 12 of the wax thermostat 10, and the control valve 24 is guided in a bearing 25. The control valve 24 in the position shown here closes the warm-air passageway 26 and opens the cold air passageway 27 to admit cold air in the direction of the arrow 28. In the other end position, not shown here, the control valve 24 closes the cold air passageway and thereby simultaneously opens the warm-air passageway 26.

We claim:

1. A plastic housing comprising an upper part assembled to a lower part with an adjusting element arranged between the two parts, the lower and upper parts being axially adjustable relative to each other, wherein the adjusting element is fixed in proper position during assembly of the upper and lower parts by welding the upper part and lower part of the plastic housing to each other in correct axial position relative to each other, and wherein at least one chamber is formed adjacent the weld between said upper part and said lower part for receiving weld efflux.

2. A plastic housing according to claim 1, wherein said adjusting element comprises a wax thermostat.

3. A plastic housing according to claim 1, wherein the upper part and lower part are spin-welded to each other.

4. A plastic housing according to claim 1, wherein a snap fastener is provided between said upper part and said lower part, whereby said upper part and said lower part can be preassembled to each other prior to welding.

5. A plastic housing according to claim 1, comprising a first efflux receiving chamber on one side of the weld and a second efflux receiving chamber on the other side of the weld.

6. A plastic housing according to claim 1, wherein the weld between the upper part and the lower part forms a gas-tight seal.

* * * * *